United States Patent
Inoue et al.

(10) Patent No.: US 9,932,434 B2
(45) Date of Patent: Apr. 3, 2018

(54) NITRILE GROUP-CONTAINING COPOLYMER RUBBER, CROSS-LINKABLE RUBBER COMPOSITION, AND CROSS-LINKED RUBBER

(71) Applicant: ZEON CORPORATION, Tokyo (JP)

(72) Inventors: Sayaka Inoue, Tokyo (JP); Nobuyoshi Emori, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/325,626

(22) PCT Filed: Jul. 30, 2015

(86) PCT No.: PCT/JP2015/071606
§ 371 (c)(1),
(2) Date: Jan. 11, 2017

(87) PCT Pub. No.: WO2016/017735
PCT Pub. Date: Feb. 4, 2016

(65) Prior Publication Data
US 2017/0166672 A1    Jun. 15, 2017

(30) Foreign Application Priority Data

Jul. 31, 2014  (JP) ................................. 2014-156426

(51) Int. Cl.
| | | |
|---|---|---|
| *C08F 236/12* | (2006.01) | |
| *C08J 3/24* | (2006.01) | |
| *C08F 220/18* | (2006.01) | |
| *C08K 5/14* | (2006.01) | |
| *C08F 220/44* | (2006.01) | |
| *C08L 9/02* | (2006.01) | |

(52) U.S. Cl.
CPC .......... *C08F 236/12* (2013.01); *C08F 220/18* (2013.01); *C08K 5/14* (2013.01); *C08F 220/44* (2013.01); *C08F 2220/1825* (2013.01); *C08L 9/02* (2013.01)

(58) Field of Classification Search
CPC ........ C08F 236/12; C08F 220/44; C08L 9/02; C08J 3/24
See application file for complete search history.

(56) References Cited

U.S. PATENT DOCUMENTS

| | | | | |
|---|---|---|---|---|
| 5,627,250 A | * | 5/1997 | Tsuji | ..................... C08F 236/12 264/328.2 |
| 5,703,189 A | | 12/1997 | Tsuji et al. | |
| 5,807,941 A | | 9/1998 | Tsuji et al. | |
| 2017/0015773 A1 | | 1/2017 | Inoue et al. | |

FOREIGN PATENT DOCUMENTS

| | | |
|---|---|---|
| EP | 0779300 A1 | 6/1997 |
| EP | 3124511 A1 | 2/2017 |
| JP | 7-53610 * | 2/1995 |
| JP | H07-53610 A | 2/1995 |
| JP | 7-118313 * | 5/1995 |
| JP | H07-118313 A | 5/1995 |
| JP | 3445615 B2 | 9/2003 |
| JP | 2005-281498 A | 10/2005 |

OTHER PUBLICATIONS http://web.mit.edu/course/3/3.941j/www/3941_S02_1.pdf, "Polymer Solution Thermodynamics" pp. 1-20; downloaded Dec. 2017.*
Teraoka, I., Polymer Solutions, An Introduction to Physical Properties; John Wiley, 2002, pp. 1-332.*
Nov. 9, 2017 extended Search Report issued within European Patent Application No. 15827635.2.
Oct. 13, 2015 International Search Report issued in International Patent Application No. PCT/JP2015/071606.
Jan. 31, 2017, International Preliminary Report on Patentability issued in International Patent Application No. PCT/JP2015/071606.

* cited by examiner

*Primary Examiner* — Roberto Rabago
(74) *Attorney, Agent, or Firm* — Oliff PLC

(57) ABSTRACT

A nitrile group-containing copolymer rubber contains $\alpha,\beta$-ethylenically unsaturated nitrile monomer units in a ratio of 10 to 60 wt % and has a Z-average radius of gyration of 100 nm or more. Preferably, the nitrile group-containing copolymer rubber has an iodine value of 120 or less. Further, preferably, the nitrile group-containing copolymer rubber has a plasticity number of 14 to 90. It is possible to provide a nitrile group-containing copolymer rubber able to give a cross-linked rubber excellent in tensile stress, compression set resistance, and low heat buildup property.

9 Claims, No Drawings

NITRILE GROUP-CONTAINING COPOLYMER RUBBER, CROSS-LINKABLE RUBBER COMPOSITION, AND CROSS-LINKED RUBBER

TECHNICAL FIELD

The present invention relates to a nitrile group-containing copolymer rubber able to give a cross-linked rubber excellent in tensile stress, compression set resistance, and low heat buildup property and to a cross-linkable rubber composition and a cross-linked rubber obtained using the nitrile group-containing copolymer rubber.

BACKGROUND ART

In the past, nitrile group-containing copolymer rubber (acrylonitrile-butadiene copolymer rubber) has been used as a material for rubber parts for automobile use such as hoses, belts, and tubes by making use of its oil resistance, mechanical properties, chemical resistance, etc. Further, nitrile group-containing highly saturated copolymer rubber obtained by saturation by hydrogenation etc. of carbon-carbon double bands in the polymer main chain of nitrile group-containing copolymer rubber is further excellent in heat resistance and is being used for rubber parts such as seals, belts, hoses, and diaphragms.

In view of such a situation, Patent Document 1 discloses a nitrile group-containing copolymer rubber composition containing a nitrile group-containing copolymer rubber obtained by hydrogenating carbon-carbon unsaturated bonds of an unsaturated nitrile-conjugated diene copolymer and a vulcanizer, where the nitrile group-containing copolymer rubber has an iodine value of 80 or less, has a Mooney viscosity ($ML_{1+4}$, 100° C.) of 30 to 100, and contains 1 to 20 wt % of gel. According to the art of this Patent Document 1, the rubber composition is excellent in processability, and a cross-linked rubber excellent in original physical properties such as tensile stress and compression set resistance is obtained.

On the other hand, in recent years, the demands for quality in the market has been rising. For example, the loads in various applications such as seals, belts, and rolls have become higher. From the viewpoints of larger tensile stress, smaller compression set, and reduced deterioration due to heat buildup and energy loss, a cross-linked rubber excellent in low heat buildup property has come to be sought. However, the cross-linked rubber obtained by cross-linking the nitrile rubber composition described in Patent Document 1 is not necessarily sufficient in low heat buildup property. To meet the recent trend toward higher loads, further improvement of the low heat buildup property has been sought.

RELATED ART

Patent Documents

Patent Document 1: Japanese Patent Publication No. 2005-281498A

SUMMARY OF THE INVENTION

Problem to be Solved by the Invention

The present invention was made in consideration of such a situation and has as its object the provision of a nitrile group-containing copolymer rubber able to give a cross-linked rubber excellent in tensile stress, compression set resistance, and low heat buildup property and of a cross-linkable rubber composition and a cross-linked rubber obtained using the nitrile group-containing copolymer rubber.

Means for Solving the Problem

The inventors engaged in intensive research for achieving the above object and as a result discovered that by controlling a nitrile group-containing copolymer rubber containing α,β-ethylenically unsaturated nitrile monomer units in a ratio of 10 to 60 wt % so that a Z-average radius of gyration becomes 100 nm or more, it is possible to achieve the above object, and thereby completed the present invention.

That is, according to the present invention, there is provided a nitrile group-containing copolymer rubber containing α,β-ethylenically unsaturated nitrile monomer units in a ratio of 10 to 60 wt % and having a Z-average radius of gyration of 100 nm or more.

Preferably, an iodine value of the nitrile group-containing copolymer rubber of the present invention is 120 or less.

Preferably, a plasticity number of the nitrile group-containing copolymer rubber of the present invention is 14 to 90.

Preferably, a heat loss of the nitrile group-containing copolymer rubber, measured by the oven method prescribed in JIS K6238-1, is 20 wt % or less.

Preferably, the nitrile group-containing copolymer rubber of the present invention contains diene manner units and/or α-olefin monomer units in a ratio of 40 to 90 wt %.

Preferably, the nitrile group-containing copolymer rubber of the present invention contains α,β-ethylenically unsaturated monocarboxylic acid ester monomer units in a ratio of 5 to 50 wt %.

Preferably, the nitrile group-containing copolymer rubber of the present invention contains carboxyl group-containing monomer units in a ratio of 1 to 30 wt %.

Further, according to the present invention, there are provided a cross-linkable rubber composition comprising the above nitrile group-containing copolymer rubber and a cross-linking agent and a cross-linked rubber obtained by cross-linking the cross-linkable rubber composition.

Effects of Invention

According to the present invention, it is possible to provide a nitrile group-containing copolymer rubber able to give a cross-linked rubber excellent in tensile stress, compression set resistance, and low heat buildup property and a cross-linkable rubber composition and a cross-linked rubber obtained using the nitrile group-containing copolymer rubber.

DESCRIPTION OF EMBODIMENTS

Nitrile Group-Containing Copolymer Rubber

The nitrile group-containing copolymer rubber of the present invention is rubber containing α,β-ethylenically unsaturated nitrile monomer units in a ratio of 10 to 60 wt % and having a Z-average radius of gyration of 100 nm or more.

The α,β-ethylenically unsaturated nitrile monomer forming the α,β-ethylenically unsaturated nitrile monomer units contained in the nitrile group-containing copolymer rubber of the present invention is not particularly limited, but one having 3 to 18 carbon atoms is preferable, while one having 3 to 9 carbon atoms is particularly preferable. As specific examples, acrylonitrile, methacrylonitrile, α-chloroacrylonitrile, etc. may be mentioned. Among these, acrylonitrile is preferable. These α,β-ethylenically unsaturated nitrile monomers may be used as single types alone or may be used as two types or more combined.

In the nitrile group-containing copolymer rubber of the present invention, the content of the α,β-ethylenically unsaturated nitrile monomer units is 10 to 60 wt %, preferably 12 to 58 wt %, more preferably 16 to 50 wt %. If the content of the α,β-ethylenically unsaturated nitrile monomer units is too small, the obtained cross-linked product is liable to be inferior in oil resistance, while conversely if too large, the cold resistance may fall.

Further, from the viewpoint of the improvement of the mechanical properties by rubber elasticity, the nitrile group-containing copolymer rubber of the present invention preferably further contains diene monomer units and/or α-olefin monomer units.

As the diene monomer forming the diene monomer units, a conjugated diene having 4 or more carbon atoms such as 1,3-butadiene, isoprene, 2,3-dimethyl-1,3-butadiene, and 1,3-pentadiene; and a nonconjugated diene having 5 to 12 carbon atoms such as 1,4-pentadiene and 1,4-hexadiene may be mentioned. Among these, a conjugated diene is preferable, while 1,3-butadiene is more preferable. The α-olefin monomer forming the α-olefin monomer units is preferably one having 2 to 12 carbon atoms. Ethylene, propylene, 1-butene, 4-methyl-1-pentene, 1-hexene, 1-octene, etc. may be illustrated. These diene monomers and α-olefin monomers may be used as single types alone or may be used as two types or more combined.

In the nitrile group-containing copolymer rubber of the present invention, the content of the diene monomer units and/or α-olefin monomer units is preferably 40 to 90 wt %, more preferably 41 to 85 wt %, still more preferably 43 to 80 wt %. By making the content of the diene monomer units and/or α-olefin monomer units the above range, it is possible to make the obtained cross-linked rubber maintain the heat resistance and chemical resistance stability well while making it excellent in rubbery elasticity.

Further, from the viewpoint of improvement of the cold resistance, the nitrile group-containing copolymer rubber of the present invention may further contain α,β-ethylenically unsaturated monocarboxylic acid ester monomer units.

As the α,β-ethylenically unsaturated monocarboxylic acid ester monomer forming the α,β-ethylenically unsaturated monocarboxylic acid ester monomer units, for example, a (meth)acrylic acid ester (abbreviation for "methacrylic acid ester and acrylic acid ester", same below) having an alkyl group containing 1 to 18 carbon atoms such as methyl acrylate, ethyl acrylate, n-butyl acrylate, isobutyl acrylate, n-dodecyl acrylate, methyl methacrylate, and ethyl methacrylate; a (meth)acrylic acid ester having an alkoxyalkyl group containing 2 to 12 carbon atoms such as methoxymethyl acrylate, 2-methoxyethyl acrylate, 2-methoxyethyl methacrylate, 3-methoxypropyl acrylate, 4-ethoxybutyl methacrylate, 6-methoxyhexyl acrylate, 4-ethoxyheptyl methacrylate, and 8-methoxyoctyl acrylate; a (meth)acrylic acid ester having a cyanoalkyl group containing 2 to 12 carbon atoms such as α-cyanoethyl acrylate, α-cyanoethyl methacrylate, and cyanobutyl methacrylate; a (meth)acrylic acid ester having a hydroxyalkyl group containing 1 to 12 carbon atoms such as 2-hydroxyethyl acrylate, 2-hydroxypropyl acrylate, and 2-hydroxyethyl methacrylate; a (meth)acrylic acid ester having a fluoroalkyl group containing 1 to 12 carbon atoms such as trifluoroethyl acrylate and tetrafluoropropyl methacrylate; etc. may be mentioned. These α,β-ethylenically unsaturated monocarboxylic acid ester monomers may be used as single types alone or as two types or more combined.

In the nitrile group-containing copolymer rubber of the present invention, the content of α,β-ethylenically unsaturated monocarboxylic acid ester monomer units is preferably 5 to 50 wt %, more preferably 10 to 45 wt %, still more preferably 15 to 40 wt %. By making the content of the α,β-ethylenically unsaturated monocarboxylic acid ester monomer units the above range, it becomes possible to make the obtained cross-linked rubber excellent in fatigue resistance and abrasion resistance while improving the cold resistance.

Alternatively, from the viewpoint of further raising the low heat buildup property, the nitrile group-containing copolymer rubber of the present invention may further contain carboxyl group-containing monomer units.

The carboxyl group-containing monomer forming the carboxyl group-containing monomer units is not particularly limited so long as a monomer which can copolymerize with an α,β-ethylenically unsaturated nitrile monomer and which has one or more unsubstituted (free) carboxyl groups which are not esterified etc.

As the carboxyl group-containing monomer, for example, an α,β-ethylenically unsaturated monocarboxylic acid monomer, α,β-ethylenically unsaturated polyvalent carboxylic acid monomer, and α,β-ethylenically unsaturated dicarboxylic acid monoester monomer, etc. may be mentioned. Further, as a carboxyl group-containing monomer, a monomer with carboxyl group which forms carboxylic acid salt are also included. Furthermore, an anhydride of α,β-ethylenically unsaturated polyvalent carboxylic acid also can form a carboxyl group by cleaving the acid anhydride group after copolymerization, so can be used as a carboxyl group-containing monomer.

As the α,β-ethylenically unsaturated monocarboxylic acid monomer, acrylic acid, methacrylic acid, ethylacrylic acid, crotonic acid, cinnamic acid, etc. may be mentioned.

As the α,β-ethylenically unsaturated polyvalent carboxylic acid monomer, a butenedioic acid such as fumaric acid and maleic acid, itaconic acid, citraconic acid, mesaconic acid, glutaconic acid, allylmalonic acid, teraconic acid, etc. may be mentioned. Further, as the anhydride of an α,β-unsaturated polyvalent carboxylic acid, maleic anhydride, itaconic anhydride, citraconate anhydride, etc. may be mentioned.

As the α,β-ethylenically unsaturated dicarboxylic acid monoester monomer, a maleic acid monoalkyl ester such as monomethyl maleate, monoethyl maleate, monopropyl maleate, and mono n-butyl maleate; a maleic acid monocycloalkyl ester such as monocyclopentyl maleate, monocyclohexyl maleate, and monocycloheptyl maleate; a maleic acid monoalkylcycloalkyl ester such as monoethylcyclopentyl maleate and monoethylcyclohexyl maleate; a fumaric acid monoalkyl ester such as monomethyl fumarate, monoethyl fumarate, monopropyl fumarate, and mono n-butyl fumarate; a fumaric acid monocycloalkyl ester such as monocyclopentyl fumarate, monocyclohexyl fumarate, and monocycloheptyl fumarate; a fumaric acid monoalkylcycloalkyl ester such as monoethylcyclopentyl fumarate and monoethylcyclohexyl fumarate; a citraconic acid monoalkyl ester such as monomethyl citraconate, monoethyl citraconate, monopropyl citraconate, and mono n-butyl citraconate; a citraconic acid monocycloalkyl ester such as monocyclopentyl citraconate, monocyclohexyl citraconate, and monocycloheptyl citraconate; a citraconic acid monoalkylcycloalkyl ester such as monoethylcyclopentyl citraconate and monoethylcyclohexyl citraconate; an itaconic acid monoalkyl ester such as monoethyl itaconate, monoethyl itaconate, monopropyl itaconate, and mono n-butyl itaconate; an itaconic acid monocycloalkyl ester such as monocyclopentyl itaconate, monocyclohexyl itaconate, and monocycloheptyl itaconate; an itaconic acid monoalkylcycloalkyl ester such as monoethylcyclopentyl itaconate and monoethylcyclohexyl itaconate; etc. may be mentioned.

The carboxyl group-containing monomers may be used as single types alone or as a plurality of types together. Among these as well, since the effect of the present invention becomes much more remarkable, an α,β-ethylenically unsaturated dicarboxylic acid monoester monomer is preferable, a maleic acid monoalkyl ester is more preferable, and mono n-butyl maleate is particularly preferable. Note that, the alkyl group of the above-mentioned alkyl ester preferably has 2 to 8 carbon atoms.

In the nitrile group-containing copolymer rubber of the present invention, the content of the carboxyl group-containing monomer units is preferably 1 to 30 wt %, more preferably 2 to 25 wt %, still more preferably 2 to 20 wt %. By making the content of the carboxyl group-containing monomer units the above range, the obtained cross-linked rubber becomes good in fatigue resistance while can be further improved in low heat buildup property.

Further, the nitrile group-containing copolymer rubber of the present invention may contain, in addition to units of the above-mentioned monomers, units of another monomer which can copolymerize with these monomers. As such other monomer, an unconjugated diene monomer, aromatic vinyl monomer, cross-linkable monomer, copolymerizable antiaging agent, monomer having an epoxy group, etc. may be mentioned.

As the unconjugated diene monomer, one having 5 to 12 carbon atoms is preferable. For example, 1,4-pentadiene, 1,4-hexadiene, vinyl norbornene, dicyclopentadiene, etc. may be mentioned.

As the aromatic vinyl monomer, for example, styrene, α-methylstyrene, vinylpyridine, etc. may be mentioned.

As the cross-linkable monomer, for example, a polyfunctional ethylenically unsaturated monomer such as a divinyl compound such as divinylbenzene; a di(meth)acrylaic acid ester such as ethylene di(meth)acrylate, diethyleneglycol di(meth)acrylate, and ethyleneglycol di(meth)acrylate; a trimethacrylic acid ester such as trimethylolpropane tri(meth)acrylate; etc. and also self-cross-linkable monomers such as N-methylol(meth)acrylamide and N,N'-dimethylol (meth)acrylamide, etc. may be mentioned.

As the copolymerizable antiaging agent, for example, n-(4-anilinophenyl) acrylamide, N-(4-anilinophenyl)methacrylamide, N-(4-anilinophenyl)cinnamamide, N-(4-anilinophenyl)crotonamide, N-phenyl-4-(3-vinylbenzyloxy) aniline, N-phenyl-4-(4-vinylbenzyloxy) aniline, etc. may be mentioned.

As the monomer having an epoxy group, 2-ethylglycidyl acrylate, 2-ethylglycidyl methacrylate, 2-(n-propyl)glycidyl acrylate, 2-(n-propyl)glycidyl methacrylate, 2-(n-butyl)glycidyl acrylate, 2-(n-butyl) glycidyl methacrylate, glycidyl methacrylate, glycidylmethyl methacrylate, glycidyl acrylate, (3',4'-epoxyheptyl)-2-ethyl acrylate, (3',4'-epoxyheptyl)-2-ethyl methacrylate, 6',7'-epoxyheptyl acrylate, 6',7'-epoxyheptyl methacrylate, allylglycidyl ether, allyl-3,4-epoxyheptyl ether, 6,7-epoxyheptylallyl ether, vinylglycidyl ether, vinyl-3,4-epoxyheptyl ether, 3,4-epoxyheptylvinyl ether, 6,7-epoxyheptylvinyl ether, o-vinylbenzylglycidyl ether, m-vinylbenzylglycidyl ether, p-vinylbenzylglycidyl ether, 3-vinylcyclohexene oxide, etc. may be mentioned.

The other copolymerizable monomers may be a plurality of types used together. In the nitrile group-containing copolymer rubber of the present invention, the content of the units of the other monomers is preferably 50 wt % or less, more preferably 30 wt % or less, still more preferably 10 wt % or less.

Further, the nitrile group-containing copolymer rubber of the present invention is controlled to a Z-average radius of gyration of 100 nm or more, preferably 100 to 1000 nm in range, more preferably 100 to 950 nm in range. In the present invention, by controlling the Z-average radius of gyration to the above range, it is possible to make the obtained cross-linked rubber which is obtained by using such a nitrile group-containing copolymer rubber excellent in tensile stress, compression set resistance, and low heat buildup property. If the Z-average radius of gyration is too small, the obtained cross-linked rubber ends becoming inferior in tensile stress, compression set resistance, and low heat buildup property.

Note that, the "Z-average radius of gyration" is an indicator showing the spread from the center of gravity of a molecular chain. For example, a solution of the nitrile group-containing copolymer rubber prepared by dissolving the nitrile group-containing copolymer rubber of the present invention in a solvent which can dissolve it (for example, chloroform, tetrahydrofuran, monochlorobenzene, or acetone) can be measured using field flow fractionation (FFF)-multiangle light scattering (MALS) for measurement. Specifically, it is possible to dissolve the nitrile group-containing copolymer rubber in a solvent and measure the solution of the obtained nitrile group-containing copolymer rubber by multiangle light scattering (MALS) detector and field flow fractionation (FFF) provided with a differential refractometer so as to measure the Z-average radius of gyration. In this case, it is possible to employ the method of using a Zimn equation to create a Debye plot from the measurement value obtained from the multiangle light scattering detector and the value of the concentration measured by the differential refractometer.

Here, the dn/dc value (increase in refractive index corresponding to concentration: value expressing to what extent refractive index of polymer solution changes with respect to change of concentration of solute) is also necessary when finding the Z-average radius of gyration. Separate from the measurement by the field flow fractionation (FFF), a plurality of solutions of nitrile group-containing copolymer rubber differing in rubber concentration (for example, solutions with four types of concentrations) may be prepared and these solutions may be measured for dn/dc values using a refractive index measuring device.

In the present invention, the method of making the Z-average radius of gyration the above range is not particularly limited, but, for example, the method of controlling the composition of the nitrile group-containing copolymer rubber, the method of controlling the polymerization conversion rate when stopping the polymerization after performing the polymerization reaction, the method of adjusting the type and amount of addition of the molecular weight adjuster used for polymerization by the emulsion polymerization method, the method of utilizing a metathesis reaction, the method of adjusting the type and amount of addition of the chain transfer agent by RAFT polymerization, the method of adjustment of the nitrile group-containing copolymer rubber obtained by polymerization by imparting a high shear force, etc. may be mentioned. In particular, the method of adjusting the type and amount of addition of the molecular weight adjuster used when polymerizing the monomer forming the nitrile group-containing copolymer rubber by the emulsion polymerization method etc. is preferable. Specifically, the method of using the later explained two specific types of molecular weight adjusters and adjusting the amounts of addition to the later explained predetermined ranges is preferable.

Note that, the nitrile group-containing copolymer rubber of the present invention preferably has a weight average molecular weight (Mw) of 10000 to 1000000. Note that, the weight average molecular weight (Mw) can be measured by using GPC.

Further, the nitrile group-containing copolymer rubber of the present invention preferably has a plasticity number of 14 to 90 in range, more preferably 14 to 85 in range, still more preferably 14 to 83 in range. In the present invention, by controlling the plasticity number to such a range in addition to making the Z-average radius of gyration the above range, it is possible to raise more the tensile stress, compression set resistance, and low heat buildup property in the case of making cross-linked rubber. Note that, the plasticity number of the nitrile group-containing copolymer rubber can be measured in accordance with the "plasticity number by a rapid plastometer" prescribed in JIS K6300-3.

In the present invention, the method of making the plasticity number the above range is not particularly limited, but, for example, the method of making the heat loss of the nitrile group-containing copolymer rubber a specific range, the method of making the amount of residual organic acid in the nitrile group-containing copolymer rubber a specific range, etc. may be mentioned. In this case, it is preferable to make the heat loss of the nitrile group-containing copolymer rubber preferably 20 wt % or less, particularly preferably 15 wt % or less. The heat loss of the nitrile group-containing copolymer rubber can be measured, for example, by the "oven method" prescribed in JIS K6238-1. As the method of making the heat loss the above range, for example, the method of drying the nitrile group-containing copolymer rubber under conditions enabling the volatiles to be sufficiently removed without causing deterioration of the same in the process of production of the nitrile group-containing copolymer rubber may be mentioned.

Further, the amount of residual organic acids in the nitrile group-containing copolymer rubber is preferably 15 wt % or less, particularly preferably 10 wt % or less. The amount of the residual organic acids can be measured by, for example, the method of titration, by an alkali solution, of the ingredients extracted from the nitrile group-containing copolymer rubber by using an organic solvent. As the method for making the amount of residual organic acids the above range, for example, the method of adjusting the type or amount of use of the coagulant when coagulating the emulsified polymer of the nitrile group-containing copolymer rubber, the method of raising the level of washing when coagulating the emulsified polymer of the nitrile group-containing copolymer rubber, etc. may be mentioned. Alternatively, the plasticity number of the nitrile group-containing copolymer rubber can be adjusted by controlling the heat loss or residual amount of organic acids and by further controlling the above-mentioned Z-average radius of gyration since the degree of branching of the nitrile group-containing copolymer rubber and ease of entanglement of the molecules are also affected.

Note that, the nitrile group-containing copolymer rubber of the present invention has a Mooney viscosity ($ML_{1+4}$, 100° C.) of preferably 10 to 150, more preferably 30 to 110, particularly preferably 40 to 80. By making the Mooney viscosity the above range, the action and effect of the present invention can be made much more remarkable.

Further, the nitrile group-containing copolymer rubber of the present invention is not particularly limited in iodine value, but from the point of being able to further raise the heat aging resistance and ozone resistance, it is preferably 120 or less, more preferably 80 or less, still more preferably 60 or less, particularly preferably 30 or less.

The method of production of the nitrile group-containing copolymer rubber of the present invention is not particularly limited, but the rubber is obtained by copolymerizing the above-mentioned monomers and, if necessary, hydrogenating the carbon-carbon double bonds in the obtained copolymer. The polymerization method is not particularly limited. The known emulsion polymerization method or solution polymerization method may be mentioned, but from the viewpoint of the industrial productivity, the emulsion polymerization method is preferable. At the time of emulsion polymerization, it is possible to use an emulsifier, polymerization initiator, molecular weight adjuster and other usually used polymerization secondary material.

The emulsifier is not particularly limited, but, for example, a nonionic emulsifier such as a polyoxyethylene alkyl ether, polyoxyethylene alkyl phenol ether, polyoxyethylene alkyl ester, and polyoxyethylene sorbitan alkyl ester; an anionic emulsifier such as a salt of a fatty acid such as myristic acid, palmitic acid, oleic acid, and linoleic acid, an alkylbenzene sulfonic acid salt such as sodium dodecylbenzene sulfonate, a higher alcohol sulfuric acid ester salt, and an alkyl sulfosuccinic acid salt; a copolymerizable emulsifier such as a sulfo ester of an $\alpha,\beta$-unsaturated carboxylic acid, a sulfate ester of an $\alpha,\beta$-unsaturated carboxylic acid, and a sulfoalkylaryl ether; etc. may be mentioned. The amount of addition of the emulsifier is preferably 0.1 to 10 parts by weight with respect to 100 parts by weight of the monomer used for the polymerization, more preferably 0.5 to 5 parts by weight.

The polymerization initiator is not particularly limited so long as a radical initiator, but an inorganic peroxide such as potassium persulfate, sodium persulfate, ammonium persulfate, potassium perphosphate, and hydrogen peroxide; an organic peroxide such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; an azo compound such as azobisisobutyronitrile, azobis-2,4-dimethylvaleronitrile, azobiscyclohexanecarbonitrile, and methylazobis isobutyrate; etc. may be mentioned. These polymerization initiators can be used alone or as two or more types combined. As the polymerization initiator, an inorganic or organic peroxide is preferable. Mien using a peroxide as a polymerization initiator, a reducing agent such as sodium bisulfite and ferrous sulfate may be combined with for use as a redox-type polymerization initiator. The amount of use of the polymerization initiator is preferably 0.01 to 2 parts by weight with respect to 100 parts by weight of the monomer used for the polymerization.

Further, in the present invention, to make the Z-average radius of gyration of the obtained nitrile group-containing copolymer rubber the above range, as the molecular weight adjuster, an alkylthiol compound having 12 to 16 carbon atoms which has at least three tertiary or higher carbon atoms and a thiol group directly bonding with at least one tertiary carbon atom among them (below, suitably referred to as the "first alkylthiol compound") and an alkylthiol compound having 9 to 16 carbon atoms other than the "first alkylthiol compound" (that is, an alkylthiol compound having 9 to 16 carbon atoms which has less than three tertiary or higher carbon atoms or an alkylthiol compound having 9 to 16 carbon atoms which has three or more tertiary or higher carbon atoms and does not have a thiol group directly bonding with a tertiary carbon atom, below suitably referred to as the "second alkylthiol compound") are jointly used. Further, at this time, the amount of use of the first alkylthiol compound is made 0.01 to 0.6 part by weight with respect to 100 parts by weight of the monomer used for the emulsion polymerization, preferably 0.02 to 0.4 part by weight, while the amount of use of the second alkylthiol compound is made 0.01 to 0.8 part by weight, preferably 0.1 to 0.7 part by weight. In the present invention, by using such two types of molecular weight adjusters and making the amounts of use the above ranges, the Z-average radius of gyration of the obtained nitrile group-containing copolymer rubber can be suitably controlled. Note that, in this Description, the method of controlling the Z-average radius of gyration is not particularly limited to such a method.

As specific examples of the first alkylthiol compound, while not particularly limited to these, for example, 2,2,4,6,6-pentamethyl-4-heptanethiol, 2,4,4,6,6-pentamethyl-2-heptanethiol, 2,3,4,6,6-pentamethyl-2-heptanethiol, 2,3,4,6,6-pentamethyl-3-heptanethiol, etc. may be mentioned.

Further, as specific examples of the second alkylthiol compound, t-dodecylmercaptan (a mixture containing a plurality of alkylthiol compounds having 9 to 16 carbon atoms such as 2,3,3,4,4,5-hexamethyl-2-hexanethiol), decylmercaptan, cetylmercaptan, alkyldithiol, etc. can be used.

The timing of addition of the first alkylthiol compound and second alkylthiol compound as the molecular weight adjuster is not particularly limited. These may be added all at once at the time of start of polymerization or only part may be added at the time of start of polymerization and the remainder added at the stage when reaching a predetermined polymerization conversion rate, but from the viewpoint of making the Z-average radius of gyration of the obtained nitrile group-containing copolymer rubber the above range, the method of adding this all at once at the time of start of polymerization is preferable.

For the medium of the emulsion polymerization, usually water is used. The amount of water is preferably 80 to 500 parts by weight with respect to 100 parts by weight of the monomer used for the polymerization, more preferably 80 to 300 parts by weight.

At the time of emulsion polymerization, further, in accordance with need, a polymerization secondary material such as a stabilizer, dispersant, pH adjuster, deoxidant, or particle size adjuster can be used. In the case of using these, the types and amounts of use are not particularly limited.

The polymerization conversion rate at the time of emulsion polymerization is not particularly limited, but from the viewpoint of making the Z-average radius of gyration of the obtained nitrile group-containing copolymer rubber the above range, 70% or more is preferable, while 75% or more is more preferable. In particular, in the nitrile group-containing copolymer rubber, when the content of the c, R-ethylenically unsaturated nitrile monomer units is 30 to 60 wt % which is a relatively large amount, the effect of the polymerization conversion rate in emulsion polymerization on the Z-average radius of gyration tends to become relatively larger, so in this case, the polymerization conversion rate in emulsion polymerization is preferably made 75% or more, more preferably 79% or more.

Note that, the temperature of the emulsion polymerization is preferably 0 to 70° C., more preferably 0 to 30° C.

Further, in the present invention, for the obtained copolymer, in accordance with need, the copolymer can be hydrogenated (hydrogenation reaction). The hydrogenation may be performed based on a known method. The oil layer hydrogenation method of coagulating the latex of the copolymer obtained by emulsion polymerization, then hydrogenating it in an oil layer, the aqueous layer hydrogenation method of hydrogenating the latex of the obtained copolymer as it is, etc. may be mentioned.

When performing the hydrogenation by the oil layer hydrogenation method, preferably the latex of the copolymer prepared by the above emulsion polymerization is dissolved in the organic solvent after salting out for coagulation, separation by filtration, and drying. Next, a hydrogenation reaction (oil layer hydrogenation method) is performed and the obtained hydride poured into a large amount of water to make it coagulate, then the result separated by filtration and dried to thereby obtain a nitrile group-containing copolymer rubber.

For coagulation of the latex by salting out, a known coagulant such as sodium chloride, calcium chloride, an aluminum sulfate can be used. Further, the solvent for the oil layer hydrogenation method is not particularly limited so long as a liquid organic compound dissolving the copolymer obtained by emulsion polymerization, but benzene, chlorobenzene, toluene, xylene, hexane, cyclohexane, tetrahydrofuran, methylethylketone, ethyl acetate, cyclohexanone, acetone, etc. are preferably used.

As the catalyst of the oil layer hydrogenation method, any known selective hydrogenation catalyst can be used without particular limitation. A palladium-based catalyst and rhodium-based catalyst are preferable, while a palladium-based catalyst (palladium acetate, palladium chloride, palladium hydroxide, etc.) is more preferable. These may be used as two types or more combined, but in this case, it is preferable to make the palladium-based catalyst the main active ingredient. These catalysts are usually used carried on a carrier. As the carrier, silica, silica-alumina, alumina, diatomaceous earth, activated carbon, etc. may be illustrated. The amount of use of the catalyst is preferably 10 to 5000 ppm by weight with respect to the copolymer, more preferably 100 to 3000 ppm by weight.

Alternatively, when performing the hydrogenation by the aqueous layer hydrogenation method, preferably the hydrogenation reaction is performed while adding water as needed to the latex of the copolymer prepared by the above emulsion polymerization to dilute it. The aqueous layer hydrogenation method includes the aqueous layer direct hydrogenation method of supplying hydrogen to the reaction system in the presence of a hydrogenation catalyst to hydrogenate the latex and the aqueous layer indirect hydrogenation method of reducing the latex in the presence of an oxidizing agent, reducing agent, and activating agent to hydrogenate the latex. Among these, the aqueous layer direct hydrogenation method is preferable.

In the aqueous layer direct hydrogenation method, the concentration of the copolymer in the aqueous layer (concentration in latex state) is preferably 40 wt % or less to prevent coagulation. The hydrogenation catalyst is not particularly limited so long as a compound which is hard to break down in water. As specific examples, among palladium catalysts, a palladium salt of a carboxylic acid such as formic acid, propionic acid, lauric acid, succinic acid, oleic acid, and phthalic acid; chlorinated palladium such as palladium chloride, dichloro(cyclooctadiene) palladium, dichloro(norbornadiene) palladium, and ammonium hexachloropalladate (IV); an iodide such as palladium iodide; palladium sulfate-dihydrate etc. may be mentioned. Among these as well, a palladium salt of a carboxylic acid, dichloro(norbornadiene) palladium, and ammonium hexachloropalladate (IV) are particularly preferable. The amount of use of the hydrogenation catalyst may be suitably determined, but is preferably 5 to 6000 ppm by weight with respect to the nitrile rubber, more preferably 10 to 4000 ppm by weight.

In the aqueous layer direct hydrogenation method, after the end of the hydrogenation reaction, the hydrogenation catalyst in the latex is removed. As the method, for example, the method of adding an adsorbent such as activated carbon and an ion exchange resin while stirring to make it adsorb the hydrogenation catalyst, then next filtering or separating by centrifugation the latex may be adopted. It is also possible to not remove the hydrogenation catalyst but to leave it in the latex.

Further, in the aqueous layer direct hydrogenation method, the thus obtained latex after the hydrogenation reaction is salted out to make it coagulate, separated by filtration, dried, etc. hereby a nitrile group-containing copolymer rubber can be obtained. In this case, the steps of filtration and drying following coagulation may be performed by known methods.

Cross-Linkable Rubber Composition

The cross-linkable rubber composition of the present invention is a composition of a nitrile group-containing copolymer rubber comprised of the above-mentioned nitrile group-containing copolymer rubber to which a cross-linking agent is added. The cross-linking agent is not particularly limited. A sulfur-based cross-linking agent or an organic peroxide-based cross-linking agent may be mentioned, but when the nitrile group-containing copolymer rubber has carboxyl group-containing monomer units, a polyamine cross-linking agent can also be used.

As the sulfur-based cross-linking agent, a sulfur such as powdered sulfur, flower of sulfur, precipitated sulfur, colloidal sulfur, surface-treated sulfur, and insoluble sulfur; a sulfur-containing compound such as sulfur chloride, sulfur dichloride, morpholine disulfide, alkylphenol disulfide, dibenzothiazyl disulfide, N,N'-dithio-bis(hexahydro-2H-azenopine-2), phosphorus-containing polysulfide, and high molecular weight polysulfide; a sulfur donor compound such as tetramethylthiuram disulfide, selenium dimethyldithiocarbamate, and 2-(4'-morpholinodithio)benzothiazole; etc. may be mentioned. These may be used as single types alone or as a plurality of types together.

As the organic peroxide cross-linking agent, dicumyl peroxide, cumene hydroperoxide, t-butylcumyl peroxide, p-menthane hydroperoxide, di-t-butyl peroxide, 1,3-bis(t-butylperoxyisopropyl)benzene, 1,4-bis(t-butylperoxyisopropyl)benzene, 1,1-di-t-butylperoxy-3,3-trimethylcyclohexane, 4,4-bis-(t-butyl-peroxy)-n-butyl valerate, 2,5-dimethyl-2,5-di-t-butylperoxyhexane, 2,5-dimethyl-2,5-di-t-butylperoxyhexine-3,1,1-di-t-butylperoxy-3,5,5-trimethylcyclohexane, p-chlorobenzoyl peroxide, t-butylperoxyisopropyl carbonate, t-butylperoxy benzoate, etc. may be mentioned. These may be used as single types alone or as a plurality of types combined.

The polyamine-based cross-linking agent is not particularly limited so long as a compound having two or more amino groups or a compound becoming a form having two or more amino groups at the time of cross-linking, but is preferably a compound comprised of an aliphatic hydrocarbon or aromatic hydrocarbon in which a plurality of hydrogen atoms are substituted by an amino group or hydrazide structure (structure represented by —$CONHNH_2$, where CO represents a carbonyl group) and a compound becoming that form at the time of cross-linking.

As specific examples of the polyamine-based cross-linking agent, an aliphatic polyvalent amine such as hexamethylenediamine, hexamethylenediamine carbamate, N,N-dicinnamylidene-1,6-hexanediamine, tetramethylenepentamine, and hexamethylenediamine cinnamaldehyde adduct; an aromatic polyvalent amine such as 4,4-methylenedianiline, m-phenylenediamine, 4,4-diaminodiphenylether, 3,4-diaminodiphenylether, 4,4-(m-phenylenediisopropylidene)dianiline, 4,4-(p-phenylenediisopropylidene)dianiline, 2,2-bis[4-(4-aminophenoxy)phenyl] propane, 4,4-diaminobenzanilide, 4,4-bis(4-aminophenoxy) biphenyl, m-xylylenediamine, p-xylylenediamine, and 1,3,5-benzenetriamine; and a polyvalent hydrazide such as isophthalic acid dihydrazide, terephthalic acid dihydrazide, phthalic acid dihydrazide, 2,6-naphthalene dicarboxylic acid dihydrazide, naphthalenic acid dihydrazide, oxalic acid dihydrazide, malonic acid dihydrazide, succinic acid dihydrazide, glutamic acid dihydrazide, adipic acid dihydrazide, pimelic acid dihydrazide, suberic acid dihydrazide, azelaic acid dihydrazide, sebacic acid dihydrazide, brassylic acid dihydrazide, dodecanedioic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzene tricarboxylic acid dihydrazide, aconitic acid dihydrazide, and pyromellitic acid dihydrazide; may be mentioned. Among these as well, from the viewpoint that it is possible to make the effect of the present invention more remarkable, an aliphatic polyvalent amine and aromatic polyvalent amine are preferable, hexamethylenediamine carbamate and 2,2-bis[4-(4-aminophenoxy)phenyl] propane are more preferable, and hexamethylenediamine carbamate is particularly preferable.

In the cross-linkable rubber composition of the present invention, the content of the cross-linking agent is not particularly limited, but is preferably 0.1 to 10 parts by weight with respect to 100 parts by weight of the nitrile group-containing copolymer rubber, more preferably 0.2 to 5 parts by weight.

Further, when using a polyamine-based cross-linking agent as a cross-linking agent, a basic cross-linking accelerator is preferably further included.

As specific examples of the basic cross-linking accelerator, a basic cross-linking accelerator having a ring-shaped amidine structure such as 1,8-diazabicyclo[5,4,0]undecene-7 (below, sometimes abbreviated as "DBU"), 1,5-diazacyclo[4,3,0]nonene-5 (below, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl) imidazole, 1-methylbenzoimidazole, 1-methyl-2-benzylbenzoimidazole, 1-methyl-5-nitrobenzoimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, and 1-ethoxymethyl-2-methylimidazoline; a guanidine-based basic cross-linking accelerator such as tetramethylguanidine, tetraethylguanidine, diphenylguanidine, 1,3-di-o-tolylguanidine, and o-tolylbiguanide; an aldehydeamine-based basic cross-linking accelerator such as n-butylaldehyde aniline and acetoaldehyde ammonia; a dicycloalkylamine such as dicyclopentylamine, dicyclohexylamine, and dicycloheptylamine; a secondary amine-based basic cross-linking accelerator such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, N-octylcyclooctylamine, N-hydroxymethylcyclopentylamine, N-hydroxybutylcyclohexylamine, N-methoxyethylcyclopentylamine, N-ethoxybutylcyclohexylamine, N-methoxycarbonylbutylcyclopentylamine, N-methoxycarbonylheptylcyclohexylamine, N-aminopropylcyclopentylamine, N-aminoheptylcyclohexylamine, di(2-chlorocyclopentyl)amine, and di(3-chlorocyclopentyl)amine; etc. may be mentioned. Among these, a guanidine-based basic cross-linking accelerator, secondary amine-based basic cross-linking accelerator, and basic cross-linking accelerator having a cyclic amidine structure are preferable, a basic cross-linking accelerator having a cyclic amidine structure is more preferable, 1,8-diazacyclo[5,4,0]undecene-7 and 1,5-diazacyclo[4,3,0]nonene-5 are still more preferable, and 1,8-diazacyclo[5,4,0]undecene-7 is particularly preferable. Note that, the above basic cross-linking accelerator having a cyclic amidine structure may also form a salt together with an organocarboxylic acid or alkyl phosphoric acid etc. Further, the above secondary amine-based basic cross-linking accelerator may be one in which alcohols such as an alkylene glycol and an alkyl alcohol having 5 to 20 carbon atoms is mixed. Furthermore, an inorganic acid and/or organic acid may also be included. Further, the secondary amine-based basic cross-linking accelerator and the inorganic acid and/or organic acid may form a salt and furthermore may form a complex with alkylene glycol.

When mixing in a basic cross-linking accelerator, the amount in the cross-linkable rubber composition of the present invention is preferably 0.1 to 20 parts by weight with respect to 100 parts by weight of the nitrile group-containing copolymer rubber, more preferably 0.2 to 15 parts by weight, still more preferably 0.5 to 10 parts by weight.

In the cross-linkable rubber composition of the present invention, the content of the cross-linking agent is not particularly limited, but it is preferably 0.1 to 10 parts by weight with respect to 100 parts by weight of the nitrile group-containing copolymer rubber, more preferably 0.2 to 5 parts by weight.

Furthermore, the cross-linkable rubber composition of the present invention may have blended into it, in addition to the nitrile group-containing copolymer rubber and cross-linking agent, other compounding agents which are usually used in the field of rubber processing. As such compounding agents, for example, a reinforcing agent, filler, photostabilizer, scorch preventer, plasticizer, processing aid, slip agent, tackifier, lubricant, flame retardant, acid acceptor, antifungal agent, antistatic agent, coloring agent, silane coupling agent, cross-linking aid, co-cross-linking agent, cross-linking accelerator, cross-linking retardant, foam agent, antiaging agent, etc. may be mentioned. As the amounts of these compounding agents, amounts according to the purposes of inclusion may be suitably employed.

The plasticizer is not particularly limited, but a trimellitic acid-based plasticizer or ether ester-based plasticizer etc. can be used. As specific examples, tri-2-ethylhexyl trimellitate, trimellitic acid isononyl ester, bis[2-(2-butoxyethoxy)ethyl] adipate, diheptanoate, di-2-ethylhexanoate, didecanoate, etc. may be mentioned. These may be used as single types alone or as two types or more combined.

Furthermore, the cross-linkable rubber composition of the present invention may contain rubber other than the above-mentioned nitrile group-containing copolymer rubber of the present invention to the extent not impairing the advantageous effects of the present invention.

As such rubber, acrylic rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, fluororubber, urethane rubber, chloroprene rubber, silicone rubber, natural rubber, polyisoprene rubber, etc. may be mentioned.

When mixing in rubber other than the nitrile group-containing copolymer rubber of the present invention, its amount in the cross-linkable rubber composition is preferably 30 parts by weight or less with respect to 100 parts by weight of the nitrile group-containing copolymer rubber, more preferably 20 parts by weight or less, still more preferably 10 parts by weight or less.

Further, the cross-linkable rubber composition of the present invention is prepared by mixing the above ingredients in a preferably nonaqueous system. The method of preparing the cross-linkable rubber composition of the present invention is not particularly limited, but the composition usually can be prepared by mixing the ingredients other than the cross-linking agent and ingredients which are unstable against heat such as the co-cross-linking agent etc. by a mixing machine such as a Bambury mixer, inter mixer, or kneader for primary kneading, then transferring the mixture to open rolls etc. to add the cross-linking agent and ingredients which are unstable against heat such as the co-cross-linking agent etc. for secondary kneading. Note that, the primary kneading is usually performed at 10 to 200° C., preferably 30 to 180° C. in temperature, for 1 minute to 1 hour, preferably 1 minute to 30 minutes, while the secondary kneading is usually performed at 10 to 90° C., preferably 20 to 60° C. in temperature, for 1 minute to 1 hour, preferably 1 minute to 30 minutes.

The thus obtained cross-linkable rubber composition of the present invention has a compound Mooney viscosity ($ML_{1+4}$, 100° C.) of preferably 10 to 200, more preferably 40 to 140, still more preferably 50 to 100 and is excellent in processability.

Cross-Linked Rubber

The cross-linked rubber of the present invention is one obtained by cross-linking the above-mentioned cross-linkable rubber composition of the present invention.

The cross-linked rubber of the present invention can be produced by using the cross-linkable rubber composition of the present invention, using a forming machine which corresponds to the desired shape, for example, an extruder, injection molding machine, press, rolls, etc. for forming, heating to cause a cross-linking reaction and thereby fixing the shape as a cross-linked product. In this case, it is possible to form the rubber, then cross-link it and possible to cross-link it simultaneously with forming. The forming temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 1 hour.

Further, depending on the shape, size, etc. of the cross-linked product, sometimes, even if the surface is cross-linked, the inside part is not sufficiently cross-linked, so it is possible to further heat the rubber for secondary cross-linking.

As the heating method, a general method which is used for cross-linking rubber such as press heating, steam heating, oven heating, and hot air heating may be suitably selected.

The thus obtained cross-linked rubber of the present invention is one obtained by cross-linking a cross-linkable rubber composition containing the above-mentioned nitrile group-containing copolymer rubber of the present invention and is excellent in tensile stress, compression set resistance, and low heat buildup property.

For this reason, the cross-linked rubber of the present invention, taking advantage of such a characteristic, can be used for various seal members such as O-rings, packings, diaphragms, oil seals, shaft seals, bearing seals, well head seals, air compressor seals, seals for sealing in Freon or fluorohydrocarbons or carbon dioxide which is used for compressors for cooling devices for air conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventers), and bladders; various types of gaskets such as intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator use gaskets which are attached between pairs of housings straddling unit cells provided with positive electrodes, electrolyte plates, and negative electrodes, and top cover use gaskets for hard disk drives; various types of rolls such as printing use rolls, ironmaking use rolls, paper-making use rolls, industrial use rolls, and office equipment use rolls; various types of belts such as flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT use belts, timing belts, toothed belts, and conveyor belts; various types of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; and various types of boots such as CVJ boots, propeller shaft boots, constant velocity joint boots, and rack and pinion boots; attenuating member rubber parts such as cushion materials, dynamic dampers, rubber couplings, air springs, shock absorbers, and clutch facing materials; dust covers, automotive interior members, friction materials, tires, covered cables, shoe soles, electromagnetic wave shields, binders for flexible printed circuits boards or other binders, fuel cell separators and also other broad applications in the electronics field.

EXAMPLES

Below, Examples and Comparative Examples will be given to more specifically explain the present invention, but the present invention is not limited to these Examples. Below, unless particularly indicated, "parts" are based on weight. The methods of tests and evaluations of the physical properties and characteristics were conducted as follows:

Iodine Value

The iodine value of the nitrile group-containing highly saturated copolymer rubber was measured in accordance with JIS K 6235.

Ratio of Content of Monomer Units Forming Nitrile Group-Containing Copolymer Rubber The ratio of content of mono n-butyl maleate units was found as follows. To 0.2 g of 2 mm square piece of highly saturated nitrile rubber, 100 ml of 2-butanone was added and stirred for 16 hours, then 20 ml of ethanol and 10 ml of water were added. While stirring, a 0.02N hydrous ethanol solution of potassium hydroxide was used for titration at room temperature using Thymolphthalein as an indicator to thereby find the number of moles of carboxyl groups with respect to 100 g of the nitrile group-containing copolymer rubber. The number of moles found was converted to amount of mono n-butyl maleate units to find the content.

The ratios of content of the 1,3-butadiene units and saturated butadiene units were calculated by using the nitrile group-containing copolymer rubber and measuring the iodine value before a hydrogenation reaction and after a hydrogenation reaction (based on JIS K 6235).

The ratio of content of the acrylonitrile units was calculated by measuring the content of nitrogen in the nitrile group-containing copolymer rubber in accordance with JIS K6384 by the Kjeldahl method.

The ratios of content of the n-butyl acrylate units, and 2-methoxyethyl acrylate units were calculated as remaining ingredients with respect to the above monomer units.

Z-Average Radius of Gyration

The Z-average radius of gyration of the nitrile group-containing copolymer rubber was measured by the field flow fractionation (FFF)-multiangle light scattering method (MALS). Specifically, the nitrile group-containing copolymer rubber was dissolved in tetrahydrofuran, then the obtained tetrahydrofuran solution of the nitrile group-containing copolymer rubber was measured for Z-average radius of gyration using field flow fractionation (FFF) provided with a multi-angle light scattering (MALS) detector and differential refractometer. Note that, the measurement was performed under the following conditions:

Device: product name "ECLIPSE" (made by Wyatt Technology)

Measuring device 1: Multi-angle light scattering detector, product name "DAN HELEOS-II" (made by Wyatt Technology))

Measuring device 2: differential refractometer, product name "Optilab TrEX" (made by Wyatt Technology)

Further, when determining the Z-average radius of gyration by measurement by FFF-MALS, it is necessary to find the dn/dc value (increase of refractive index according to concentration), but in the present measurement, as the tetrahydrofuran solution of the nitrile group-containing highly saturated copolymer rubber, four types of solutions of different concentrations (0.5 mg/ml, 1.0 mg/ml, 1.5 mg/ml, and 2.0 mg/ml solutions) were prepared and a refractive index measuring device, product name "Optilab TrEX" (made by Wyatt Technology), was used to measure the dn/dc value.

Plasticity Number

The plasticity number of the nitrile group-containing copolymer rubber was measured based on JIS K6300-3.

Heat Loss

The heat loss of the nitrile group-containing copolymer rubber was determined based an the "oven method" prescribed in JIS K6238-1. 10 g of the nitrile group-containing copolymer rubber was placed in a 105±5° C. oven and dried until the mass substantially no longer changed. The decrease in mass before and after drying was calculated. Further, the rate of decrease of mass was found from the calculated amount of decrease of mass and this used as the heat loss (units: %).

100% Tensile Stress

The cross-linkable rubber composition was placed into a vertical 15 an, horizontal 15 an, depth 0.2 an mold and pressed at a press pressure of 10 MPa while heating it at 170° C. for 20 minutes for press forming to obtain sheet shaped cross-linked rubber. Next, the obtained cross-linked rubber was transferred to a gear type oven and heated at 170° C. for 4 hours for secondary cross-linking. The obtained sheet shaped cross-linked rubber was punched in the grain direction by a No. 3 dumbbell die to prepare a test piece. Further, the obtained test piece was used according to JIS K6251 to measure the 100% tensile stress.

Compression Set Test (Disk Compression Set)

The cross-linkable rubber composition was placed in an inside diameter 29 mm, depth 12.5 mm columnar mold and pressed at 170° C. for 20 minutes by a pressure of 10 MPa to cross-link it, then was secondarily cross-linked at 170° C. for 4 hours to obtain a cross-linked rubber test piece. The compression set (disk compression set) was measured in accordance with JIS K6262 using such test pieces after holding than at 150° C. in a 25% compressed state for 168 hours. Note that, the compression set (disk compression set) was found for Examples 1 to 3 and Comparative Examples 1 to 3.

Compression Set Test (O-Ring Compression Set)

The cross-linkable rubber composition was placed in an outside diameter 30 mm, inside diameter 23.8 am, ring radius 3.1 mm mold, pressed at 170° C. for 20 minutes by a pressure of 10 MPa to cross-link it, then secondarily cross-linked at 170° C. for 4 hours to obtain O-ring shaped cross-linked rubber. Further, using O-ring shaped cross-linked rubber, the compression set (O-ring compression set) was measured in accordance with JIS K6262 in the state with the distance between the two flat surfaces sandwiching the O-ring shaped cross-linked rubber compressed 25% in the ring thickness direction and under conditions of 150° C. for 168 hours. The smaller the value, the better the compression set resistance. Note that, the compression set (O-ring compression set) was found for Examples 4 to 6 and Comparative Examples 4 and 5.

Heat Buildup Test

The heat buildup resistance was evaluated by a flexometer test prescribed in ASTM D 623-78. Specifically, first, the cross-linkable rubber composition was placed in a diameter 17.8±0.15 m, depth 25±0.25 mm columnar mold and cross-linked at 170° C. for 20 minutes, then was secondarily cross-linked at 170° C. for 4 hours to thereby obtain a test piece for a flexometer test. Further, using a flexometer (Gabometer 4000, made by GABO), test temperature 100° C., dynamic displacement was applied to the rubber for 25 minutes under the conditions of an initial load of 1 MPa and dynamic displacement of 4.45 mm to conduct a heat buildup test. Note that the measurement frequency at this time was made 30 Hz. Further, from the results of the heat buildup test, the HBU (heat buildup: difference between temperature of the test piece measured and ambient temperature 100° C. made the heat buildup temperature) was measured. The HBU was measured at the surface of the test piece and the inside. The smaller the HBU, the smaller the dynamic heat buildup and the better the dynamic heat buildup resistance.

Synthesis Example 1 (Production of Nitrile Group-Containing Copolymer Rubber (A1))

To a reactor, 200 parts of ion-exchanged water and 0.2 part of sodium carbonate were charged. After the sodium carbonate was dissolved, 2.25 parts of fatty acid potassium soap (potassium salt of fatty acid) was added to prepare a soap aqueous solution. Further, to the obtained soap aqueous solution, 13 parts of acrylonitrile, 29 parts of n-butyl acrylate, 0.45 part of t-dodecylmercaptan (second alkylthiol compound), and 0.03 part of 2,2,4,6,6-pentamethyl-4-heptanethiol (first alkylthiol compound) were charged in that order. The inside gas was replaced with nitrogen three times, then 21 parts of 1,3-butadiene was charged. Next, the inside of the reactor was held at 5° C., then 0.1 part of cumene hydroperoxide (polymerization initiator) and suitable amounts of a reducing agent and chelating agent were charged, then the polymerization reaction was started. Further, when the polymerization conversion rate became 60%, 12 parts of acrylonitrile and 25 parts of 1,3-butadiene were added. When the polymerization conversion rate became 85%, 0.1 part of concentration 10% hydroquinone (polymerization terminator) aqueous solution was added to stop the polymerization reaction. A water temperature 60° C. rotary evaporator was used to remove the residual monomers to obtain a latex of copolymer rubber (solid content concentration of about 25 wt %).

Next, the above obtained latex was added to an amount of an aqueous solution of aluminum sulfate corresponding to 3 wt % of this copolymer rubber and stirred to coagulate the latex. This was washed with water while separating it by filtration, then was dried in vacuo at 60° C. for 12 hours to obtain a nitrile rubber.

Further, the obtained nitrile rubber was dissolved in acetone to a concentration of 12%. This was placed in an autoclave. 500 ppm by weight of a palladium-silica catalyst was added to nitrile rubber and a hydrogenation reaction performed at a hydrogen pressure of 3.0 MPa. After the end of the hydrogenation reaction, the result was poured into a large amount of water to make it coagulate then was separated by filtration and dried to obtain a nitrile group-containing copolymer rubber (A1). The obtained nitrile group-containing copolymer rubber (A1) was comprised of 25.6 wt % of acrylonitrile units, 29.4 wt % of n-butyl acrylate units, and 45 wt % of butadiene units (including saturated parts). The iodine value was 15. Further, the obtained nitrile group-containing copolymer rubber (A1) was measured for Z-average radius of gyration, plasticity number, and heat loss. The results are shown in Table 1. Note that, when measuring the amount of residual organic acid of the nitrile group-containing copolymer rubber (A1) in accordance with the above-mentioned method, it was 10 wt % or less.

Synthesis Example 2 (Production of Nitrile Group-Containing Copolymer Rubber (A2))

To a reactor, 200 parts of ion-exchanged water and 0.2 part of sodium carbonate were charged. After the sodium carbonate was dissolved, 2.25 parts of fatty acid potassium soap (potassium salt of fatty acid) was added to prepare a soap aqueous solution. Further, to the obtained soap aqueous solution, 9 parts of acrylonitrile, 25 parts of n-butyl acrylate, 0.5 part of t-dodecylmercaptan (second alkylthiol compound), and 0.04 part of 2,2,4,6,6-pentamethyl-4-heptanethiol (first alkylthiol compound) were charged in that order. The inside gas was replaced with nitrogen three times, then 35 parts of 1,3-butadiene was charged. Next, the inside of the reactor was held at 10° C., then 0.1 part of cumene hydroperoxide (polymerization initiator) and suitable amounts of a reducing agent and chelating agent were charged, then the polymerization reaction was started. Further, when the polymerization conversion rate became 60%, 10 parts of acrylonitrile, 10 parts of n-butyl acrylate, and 11 parts of 1,3-butadiene were added. When the polymerization conversion rate became 80%, 0.1 part of concentration 10% hydroquinone (polymerization terminator) aqueous solution was added to stop the polymerization reaction. A water temperature 60° C. rotary evaporator was used to remove the residual monomers to obtain a latex of copolymer rubber (solid content concentration of about 25 wt %).

Next, the above obtained latex was added to an amount of an aqueous solution of aluminum sulfate corresponding to 3 wt % of this copolymer rubber and stirred to coagulate the latex. This was washed with water while separating it by filtration, then was dried in vacuo at 60° C. for 12 hours to obtain a nitrile rubber.

Further, the obtained nitrile rubber was dissolved in acetone to a concentration of 12%. This was placed in an autoclave. 500 ppm by weight of a palladium-silica catalyst was added to this nitrile rubber and a hydrogenation reaction performed at a hydrogen pressure of 3.0 MPa. After the end of the hydrogenation reaction, the result was poured into a large amount of water to make it coagulate then was separated by filtration and dried to obtain a nitrile group-containing copolymer rubber (A2). The obtained nitrile group-containing copolymer rubber (A2) was comprised of 17.9 wt % of acrylonitrile units, 35.5 wt % of n-butyl acrylate units, and 46.6 wt % of butadiene units (including saturated parts). The iodine value was 18. Further, the obtained nitrile group-containing copolymer rubber (A2) was measured for Z-average radius of gyration, plasticity number, and heat loss. The results are shown in Table 1. Note that, when measuring the amount of residual organic acid of the nitrile group-containing copolymer rubber (A2) in accordance with the above-mentioned method, it was 10 wt % or less.

Synthesis Example 3 (Production of Nitrile Group-Containing Copolymer Rubber (A3))

To a reactor, 200 parts of ion-exchanged water and 0.2 part of sodium carbonate were charged. After the sodium carbonate was dissolved, 2.25 parts of fatty acid potassium soap (potassium salt of fatty acid) was added to prepare a soap aqueous solution. Further, to the obtained soap aqueous solution, 38 parts of acrylonitrile, 0.3 part of t-dodecylmercaptan (second alkylthiol compound), 0.027 part of 2,2,4,6,6-pentamethyl-4-heptanethiol (first alkylthiol compound) ware charged in that order. The inside gas was replaced with nitrogen three times, then 62 parts of 1,3-butadiene was charged. Next, the inside of the reactor was held at 10° C., then 0.1 part of cumene hydroperoxide (polymerization initiator) and suitable amounts of a reducing agent and chelating agent were charged, then the polymerization reaction was started. Further, when the polymerization conversion rate became 90%, 0.1 part of concentration 10% hydroquinone (polymerization terminator) aqueous solution was added to stop the polymerization reaction. A water temperature 60° C. rotary evaporator was used to remove the residual monomers to obtain a latex of copolymer rubber (solid content concentration of about 25 wt %).

Next, the above obtained latex was added to an amount of an aqueous solution of aluminum sulfate corresponding to 3 wt % of this copolymer rubber and stirred to coagulate the latex. This was washed with water while separating it by filtration, then was dried in vacuo at 60° C. for 12 hours to obtain a nitrile rubber.

Further, the obtained nitrile rubber was dissolved in acetone to a concentration of 12%. This was placed in an autoclave. 300 ppm by weight of a palladium-silica catalyst was added to this nitrile rubber and a hydrogenation reaction performed at a hydrogen pressure of 3.0 MPa. After the end of the hydrogenation reaction, the result was poured into a large amount of water to make it coagulate then was separated by filtration and dried to obtain a nitrile group-containing copolymer rubber (A3). The obtained nitrile group-containing copolymer rubber (A3) was comprised of 37.1 wt % of acrylonitrile units and 62.9 wt % of butadiene units (including saturated parts). The iodine value was 11. Further, the obtained nitrile group-containing copolymer rubber (A3) was measured for Z-average radius of gyration, plasticity number, and heat loss. The results are shown in Table 1. Note that, when measuring the amount of residual organic acid of the nitrile group-containing copolymer rubber (A3) in accordance with the above-mentioned method, it was 10 wt % or less.

Synthesis Example 4 (Production of Nitrile Group-Containing Copolymer Rubber (B1))

To a reactor, 200 parts of ion-exchanged water and 0.2 part of sodium carbonate were charged. After the sodium carbonate was dissolved, 2.25 parts of fatty acid potassium soap (potassium salt of fatty acid) was added to prepare a soap aqueous solution. Further, to the obtained soap aqueous solution, 38 parts of acrylonitrile and 0.35 part of t-dodecylmercaptan (second alkylthiol compound) were charged in that order. The inside gas was replaced with nitrogen three times, then 62 parts of 1,3-butadiene was charged. Next, the inside of the reactor was held at 5° C., then 0.1 part of cumene hydroperoxide (polymerization initiator) and suitable amounts of a reducing agent and chelating agent were charged, then the polymerization reaction was started. Further, when the polymerization conversion rate became 80%, 0.1 part of concentration 10% hydroquinone (polymerization terminator) aqueous solution was added to stop the polymerization reaction. A water temperature 60° C. rotary evaporator was used to remove the residual monomers to obtain a latex of copolymer rubber (solid content concentration of about 25 wt %).

Next, the above obtained latex was added to an amount of an aqueous solution of aluminum sulfate corresponding to 3 wt % of this copolymer rubber and stirred to coagulate the latex. This was washed with water while separating it by filtration, then was dried in vacuo at 60° C. for 10 hours to obtain a nitrile rubber.

Further, the obtained nitrile rubber was dissolved in acetone to a concentration of 12%. This was placed in an autoclave. 300 ppm by weight of a palladium-silica catalyst was added to this nitrile rubber and a hydrogenation reaction performed at a hydrogen pressure of 3.0 MPa. After the end of the hydrogenation reaction, the result was poured into a large amount of water to make it coagulate then was separated by filtration and dried to obtain a nitrile group-containing copolymer rubber (B1). The obtained nitrile group-containing copolymer rubber (B1) was comprised of 36.8 wt % of acrylonitrile units and 63.2 wt % of butadiene units (including saturated parts). The iodine value was 14. Further, the obtained nitrile group-containing copolymer rubber (B1) was measured for Z-average radius of gyration, plasticity number, and heat loss. The results are shown in Table 1.

Synthesis Example 5 (Production of Nitrile Group-Containing Copolymer Rubber (B2))

To a reactor, 200 parts of ion-exchanged water and 0.2 part of sodium carbonate were charged. The sodium carbonate was made to dissolve, then 2.25 parts of fatty acid potassium soap (potassium salt of fatty acid) was added to prepare a soap aqueous solution. Further, to this soap aqueous solution, 27.8 parts of acrylonitrile and 0.45 part of t-dodecylmercaptan (second alkylthiol compound) were charged in that order, the inside gas was replaced with nitrogen three times, and 65.6 parts of 1,3-butadiene were charged. Next, the inside of the reactor was held at 5° C., then 0.1 part of cumene hydroperoxide (polymerization initiator) and suitable amounts of a reducing agent and chelating agent were charged and the polymerization reaction started. When the polymerization conversion rate became 50%, 6.6 parts of acrylonitrile was added. When the polymerization conversion rate became 80%, 0.1 part of a concentration 10% hydroquinone (polymerization terminator) aqueous solution was added to stop the polymerization reaction. A water temperature 60° C. rotary evaporator was used to remove the residual monomers to obtain a latex of copolymer rubber (solid content concentration about 25 wt %).

Next, the above obtained latex was added to an amount of an aqueous solution of aluminum sulfate corresponding to 3 wt % of this copolymer rubber and stirred to coagulate the latex. This was washed with water while separating it by filtration, then was dried in vacuo at 60° C. for 12 hours to obtain a nitrile rubber.

Further, the obtained nitrile rubber was dissolved in acetone to a concentration of 12%. This was placed in an autoclave. 300 ppm by weight of a palladium-silica catalyst was added to this nitrile rubber and a hydrogenation reaction performed at a hydrogen pressure of 3.0 MPa. After the end of the hydrogenation reaction, the result was poured into a large amount of water to make it coagulate then was separated by filtration and dried to obtain a nitrile group-containing copolymer rubber (B2). The obtained nitrile group-containing copolymer rubber (B2) was comprised of 29.9 wt % of acrylonitrile units and 70.1 wt % of butadiene units (including saturated parts). The iodine value was 14. Further, the obtained nitrile group-containing copolymer rubber (B2) was measured for Z-average radius of gyration, plasticity number and heat loss. The results are shown in Table 1.

Synthesis Example 6 (Production of Nitrile Group-Containing Copolymer Rubber (B3))

To a reactor, 200 parts of ion-exchanged water and 0.2 part of sodium carbonate was charged. The sodium carbonate was dissolved, then 2.25 part of fatty acid potassium soap (potassium salt of fatty acid) was added to prepare a soap aqueous solution. Further, to the obtained soap aqueous solution, 9 parts of acrylonitrile, 15 parts of n-butyl acrylate, and 0.55 part of t-dodecylmercaptan (second alkylthiol compound) were charged in that order. The inside gas was replaced with nitrogen three times, then 35 parts of 1,3-butadiene were charged. Next, the inside of the reactor was held at 5° C., then 0.1 part of cumene hydroperoxide (polymerization initiator) and suitable amounts of a reducing agent and chelating agent were charged and the polymerization reaction was started. When the polymerization conversion rate became 60%, 10 parts of acrylonitrile, 10 parts of n-butyl acrylate, and 21 parts of 1,3-butadiene were added. When the polymerization conversion rate became 80%, 0.1 part of a concentration 10% hydroquinone (polymerization terminator) aqueous solution was added to stop the polymerization reaction. A water temperature 60° C. rotary evaporator was used to remove the residual monomers to obtain a latex of copolymer rubber (solid content concentration about 25 wt %).

Next, the above obtained latex was added to an amount of an aqueous solution of aluminum sulfate corresponding to 3 wt % of this copolymer rubber and stirred to coagulate the latex. This was washed with water while separating it by filtration, then was dried in vacuo at 60° C. for 12 hours to obtain a nitrile rubber.

Further, the obtained nitrile rubber was dissolved in acetone to a concentration of 12%. This was placed in an autoclave. 500 ppm by weight of a palladium-silica catalyst was added to this nitrile rubber and a hydrogenation reaction performed at a hydrogen pressure of 3.0 MPa. After the end of the hydrogenation reaction, the result was poured into a large amount of water to make it coagulate then was separated by filtration and dried to obtain a nitrile group-containing copolymer rubber (B3). The obtained nitrile group-containing copolymer rubber (B3) was comprised of 18.9 wt % of acrylonitrile units, 35.5 wt % of n-butyl acrylate units, and 45.6 wt % of butadiene units (including saturated parts). The iodine value was 13. Further, the obtained nitrile group-containing copolymer rubber (B3) was measured for Z-average radius of gyration, plasticity number, and heat loss. The results are shown in Table 1.

Synthesis Example 7 (Production of Nitrile Group-Containing Copolymer Rubber (A4))

To a reactor, 180 parts of ion-exchanged water, 25 parts of concentration 10 wt % sodium dodecylbenzenesulfonate aqueous solution, 37 parts of acrylonitrile, 6 parts of mono n-butyl maleate, 0.4 part of t-dodecylmercaptan (second alkylthiol compound), and 0.01 part of 2,2,4,6,6-pentamethyl-4-heptanethiol (first alkylthiol compound) were charged in that order. The inside gas was replaced with nitrogen three times, then 57 parts of 1,3-butadiene was charged. Next, the inside of the reactor was held at 10° C., then 0.1 part of cumene hydroperoxide (polymerization initiator) was charged. While stirring, the polymerization reaction was continued. Further, when the polymerization conversion rate became 85%, 0.1 part of concentration 10% hydroquinone (polymerization terminator) aqueous solution was added to stop the polymerization reaction. A water temperature 60° C. rotary evaporator was used to remove the residual monomers to obtain a latex of copolymer rubber (solid content concentration of about 30 wt %).

Next, the above obtained latex and palladium catalyst (solution obtained by mixing 1 wt % palladium acetate acetone solution and equal amount of ion-exchanged water) were added to an autoclave so that the amount of palladium became 2,000 ppm by weight with respect to the content of copolymer rubber contained in the latex, then a hydrogenation reaction was performed at a hydrogen pressure of 3 MPa and a temperature of 50° C. for 6 hours to obtain a latex of the nitrile group-containing copolymer rubber (A4).

Further, to the obtained latex, two volumes of methanol was added to coagulate it, then the result was filtered to take out the solids (crumbs). These were dried in vacuo at 60° C. for 12 hours to thereby obtain a nitrile group-containing copolymer rubber (A4). The obtained nitrile group-containing copolymer rubber (A4) was comprised of 35.1 wt % of acrylonitrile units, 59.0 wt % of butadiene units (including saturated parts), and 5.9 wt % of mono n-butyl maleate units. The iodine value was 8. Further, the obtained nitrile group-containing copolymer rubber (A4) was measured for Z-average radius of gyration, plasticity number, and heat loss. The results are shown in Table 2. Note that, when measuring the amount of residual organic acid of the nitrile group-containing copolymer rubber (A4) in accordance with the above-mentioned method, it was 10 wt % or less.

Synthesis Example 8 (Production of Nitrile Group-Containing Copolymer Rubber (A5))

To a reactor, 180 parts of ion-exchanged water, 25 parts of a concentration 10 wt % sodium dodecylbenzenesulfonate aqueous solution, 20.4 parts of acrylonitrile, 5 parts of mono n-butyl maleate, 35.2 parts of n-butyl acrylate, 0.35 part of t-dodecylmercaptan (second alkylthiol compound), and 0.03 part of 2,2,4,6,6-pentamethyl-4-heptanethiol (first alkylthiol compound) were charged in that order. The inside gas was replaced with nitrogen three times, then 39.4 parts of 1,3-butadiene was charged. Next, the inside of the reactor was held at 10° C., 0.1 part of cumene hydroperoxide (polymerization initiator) was charged, and the polymerization reaction was continued while stirring. Further, when the polymerization conversion rate became 90%, 0.1 part of a concentration 10 wt % hydroquinone aqueous solution (polymerization terminator) was added to stop the polymerization reaction. Next, a water temperature 60° C. rotary evaporator was used to remove the residual monomers to obtain a latex of copolymer rubber (solid content concentration of about 30 wt %).

Next, the above obtained latex and palladium catalyst (solution obtained by mixing 1 wt % palladium acetate acetone solution and equal amount of ion-exchanged water) were added to an autoclave so that the amount of palladium became 2,000 ppm by weight with respect to the content of copolymer rubber contained in the latex, then a hydrogenation reaction was performed at a hydrogen pressure of 3 MPa and a temperature of 50° C. for 6 hours to obtain a latex of the nitrile group-containing copolymer rubber (A5).

Further, to the obtained latex, two volumes of methanol were added to coagulate it, then the result was filtered to take out the solids (crumbs). These were dried in vacuo at 60° C. for 12 hours to obtain the nitrile group-containing copolymer rubber (A5). The obtained nitrile group-containing copolymer rubber (A5) was comprised of 20.8 wt % of acrylonitrile units, 44.2 wt % of butadiene units (including saturated parts), 4.5 wt % of mono n-butyl maleate units, and 30.5 wt % of n-butyl acrylate units. The iodine value was 10. Further, the obtained nitrile group-containing copolymer rubber (A5) was measured for Z-average radius of gyration, plasticity number, and heat loss. The results are shown in Table 2. Note that, when measuring the amount of residual organic acid of the nitrile group-containing copolymer rubber (A5) in accordance with the above-mentioned method, it was 10 wt % or less.

Synthesis Example 9 (Production of Nitrile Group-Containing Copolymer Rubber (A6))

To a reactor, 180 parts of ion-exchanged water, 25 parts of a concentration 10 wt % sodium dodecylbenzenesulfonate aqueous solution, 20 parts of acrylonitrile, 4.5 parts of mono n-butyl maleate, 35.5 parts of 2-methoxyethyl acrylate, 0.5 part of t-dodecylmercaptan (second alkylthiol compound), and 0.01 part of 2,2,4,6,6-pentamethyl-4-heptanethiol (first alkylthiol compound) were charged in that order. The inside gas was replaced with nitrogen three times, then 40 parts of 1,3-butadiene was charged. Next, the inside of the reactor was held at 5° C., 0.1 part of cumene hydroperoxide (polymerization initiator) was charged, and the polymerization reaction was continued while stirring. Further, when the polymerization conversion rate became 90%, 0.1 part of a concentration 10 wt % hydroquinone aqueous solution (polymerization terminator) was added to stop the polymerization reaction. Next, a water temperature 60° C. rotary evaporator was used to remove the residual monomers to obtain a latex of copolymer rubber (solid content concentration of about 30 wt %).

Next, the above obtained latex and palladium catalyst (solution obtained by mixing 1 wt % palladium acetate acetone solution and equal amount of ion-exchanged water) were added to an autoclave so that the amount of palladium became 2,000 ppm by weight with respect to the content of copolymer rubber contained in the latex, then a hydrogenation reaction was performed at a hydrogen pressure of 3 MPa and a temperature of 50° C. for 6 hours to obtain a latex of the nitrile group-containing copolymer rubber (A6).

Further, to the obtained latex, two volumes of methanol were added to coagulate it, then the result was filtered to take out the solids (crumbs). These were dried in vacuo at 60° C. for 12 hours to obtain the nitrile group-containing copolymer rubber (A6). The obtained nitrile group-containing copolymer rubber (A6) was comprised of 24.0 wt % of acrylonitrile units, 47.8 wt % of butadiene units (including saturated parts), 5.2 wt % of mono n-butyl maleate units, and 23.0 wt % of 2-methoxyethyl acrylate units. The iodine value was 9. Further, the obtained nitrile group-containing copolymer rubber (A6) was measured for Z-average radius of gyration, plasticity number, and heat loss. The results are shown in Table 2. Note that, when measuring the amount of residual organic acid of the nitrile group-containing copolymer rubber (A6) in accordance with the above-mentioned method, it was 10 wt % or less.

Synthesis Example 10 (Production of Nitrile Group-Containing Copolymer Rubber (B4))

To a reactor, 180 parts of ion-exchanged water, 25 parts of a concentration 10 wt % sodium dodecylbenzenesulfonate aqueous solution, 37 parts of acrylonitrile, 6 parts of mono n-butyl maleate, and 0.45 part of t-dodecylmercaptan (second alkylthiol compound) were charged in that order. The inside gas was replaced with nitrogen three times, then 57 parts of 1,3-butadiene was charged. Next, the inside of the reactor was held at 5° C., 0.1 part of cumene hydroperoxide (polymerization initiator) was charged, and the polymerization reaction was continued while stirring for 16 hours. Further, when the polymerization conversion rate became 80%, 0.1 part of a concentration 10 wt % hydroquinone aqueous solution (polymerization terminator) was added to stop the polymerization reaction. Next, a water temperature 60° C. rotary evaporator was used to remove the residual monomers to obtain a latex of copolymer rubber (solid content concentration of about 30 wt %).

Next, the above obtained latex and palladium catalyst (solution obtained by mixing 1 wt % palladium acetate acetone solution and equal amount of ion-exchanged water) were added to an autoclave so that the amount of palladium became 2,000 ppm by weight with respect to the content of copolymer rubber contained in the latex, then a hydrogenation reaction was performed at a hydrogen pressure of 3 MPa and a temperature of 50° C. for 6 hours to obtain a latex of the nitrile group-containing copolymer rubber (B4).

Further, to the obtained latex, two volumes of methanol was added to coagulate it, then the result was filtered to take out the solids (crumbs). These were dried in vacuo at 60° C. for 8 hours to thereby obtain a nitrile group-containing copolymer rubber (B4). The obtained nitrile group-containing copolymer rubber (B4) was comprised of 36.2 wt % of acrylonitrile units, 58.8 wt % of butadiene units (including saturated parts), and 5.0 wt % of mono n-butyl maleate units. The iodine value was 8. Further, the obtained nitrile group-containing copolymer rubber (B4) was measured for Z-average radius of gyration, plasticity number, and heat loss. The results are shown in Table 2.

Synthesis Example 11 (Production of Nitrile Group-Containing Copolymer Rubber (B5))

To a reactor, 180 parts of ion-exchanged water, 25 parts of concentration 10 wt % sodium dodecylbenzenesulfonate aqueous solution, 20.4 parts of acrylonitrile, 5 parts of mono n-butyl maleate, 35.2 parts of n-butyl acrylate, and 0.4 part of t-dodecylmercaptan (second alkylthiol compound) were charged in that order. The inside gas was replaced with nitrogen three times, then 39.4 parts of 1,3-butadiene was charged. Next, the inside of the reactor was held at 5° C., 0.1 part of cumene hydroperoxide (polymerization initiator) was charged, and the polymerization reaction was continued while stirring. Further, when the polymerization conversion rate became 80%, 0.1 part of a concentration 10 wt % hydroquinone aqueous solution (polymerization terminator) was added to stop the polymerization reaction. Next, a water temperature 60° C. rotary evaporator was used to remove the residual monomers to obtain a latex of copolymer rubber (solid content concentration of about 30 wt %).

Next, the above obtained latex and palladium catalyst (solution obtained by mixing 1 wt % palladium acetate acetone solution and equal amount of ion-exchanged water) were added to an autoclave so that the amount of palladium became 2,000 ppm by weight with respect to the content of copolymer rubber contained in the latex, then a hydrogenation reaction was performed at a hydrogen pressure of 3 MPa and a temperature of 50° C. for 6 hours to obtain a latex of the nitrile group-containing copolymer rubber (B5).

Further, to the obtained latex, two volumes of methanol was added to coagulate it, then the result was filtered to take out the solids (crumbs). These were dried in vacuo at 60° C. for 8 hours to thereby obtain a nitrile group-containing copolymer rubber (B5). The obtained nitrile group-containing copolymer rubber (B5) was comprised of 19.7 wt % of acrylonitrile units, 44.3 wt % of butadiene units (including saturated parts), 4.8 wt % of mono n-butyl maleate units, and 31.2 wt % of n-butyl acrylate units. The iodine value was 9. Further, the obtained nitrile group-containing copolymer rubber (B5) was measured for Z-average radius of gyration, plasticity number, and heat loss. The results are shown in Table 2.

Example 1

Using a Bambury mixer, to 100 parts of the nitrile group-containing copolymer rubber (A1) obtained in Synthesis Example 1, 50 parts of FEF carbon (product name "Seast SO", made by Tokai Carbon, carbon black), 4 parts of tri-2-ethylhexyl trimellitate (product name "ADK cizer C-8", made by Adeka, plasticizer), 1 part of polyether ester-based plasticizer (product name "ADK cizer RS-700", made by Adeka), 1.5 parts of 4,4'-di-(α,α-dimethylbenzyl) diphenylamine (product name "Nocrac CD", made by Ouchi Shinko Chemical Industrial, antiaging agent), 1.5 parts of a zinc salt of 2-mercaptobenzimidazole (product name "Nocrac MBZ", made by Ouchi Shinko Chemical Industrial, antiaging agent), 1 part of stearic acid, 5 parts of zinc oxide (Zinc White No. 1, made by Seido Chemical Industry), and 8 parts of 1,3-bis(t-butylperoxyisopropyl)benzene 40% product (product name "Vul Cup 40KE", made by Arkema, organoperoxide cross-linking agent) were added and kneaded to obtain a cross-linkable rubber composition.

Further, the obtained cross-linkable rubber composition was measured and tested by the above-mentioned methods for 100% tensile stress, compression set resistance test (disk compression set), and heat buildup test. The results are shown in Table 1.

Example 2

Except for using, instead of 100 parts of the nitrile group-containing copolymer rubber (A1), 100 parts of the nitrile group-containing copolymer rubber (A2) obtained in Synthesis Example 2, changing the amount of the tri-2-ethylhexyl trimellitate from 4 parts to 3 parts, not using the polyether ester-based plasticizer (product name "ADK cizer RS-700", made by Adeka), but using 2 parts of another polyether ester-based plasticizer (product name "ADK cizer RS-735", made by Adeka), the same procedure was followed as in Example 1 to obtain a cross-linkable rubber composition and the same procedure was followed to evaluate it. The results are shown in Table 1.

Example 3

Except for using, instead of 100 parts of the nitrile group-containing copolymer rubber (A1), 100 parts of the nitrile group-containing copolymer rubber (A3) obtained in Synthesis Example 3, changing the amount of FEF carbon from 50 parts to 40 parts, changing the amount of tri-2-ethylhexyl trimellitate from 4 parts to 3 parts, not using a polyether ester-based plasticizer (product name "ADK cizer RS-700", made by Adeka), but using 2 parts of isononyl trimellitate ester (product name "ADK cizer C-9N", made by Adeka), the same procedure was followed as in Example 1 to obtain a cross-linkable rubber composition and the same procedure was followed to evaluate it. The results are shown in Table 1.

Comparative Examples 1 and 2

Except for using, instead of 100 parts of the nitrile group-containing copolymer rubber (A1), respectively 100 parts of the nitrile group-containing copolymer rubber (B1) and nitrile group-containing copolymer rubber (B2) obtained in Synthesis Examples 4 and 5, changing the amount of FEF carbon from 50 parts to 40 parts, changing the amount of the tri-2-ethylhexyl trimellitate from 4 parts to 5 parts, and not using a polyether ester-based plasticizer, the same procedure was followed as in Example 1 to obtain a cross-linkable rubber composition and the same procedure was followed to evaluate them. The results are shown in Table 1.

Comparative Example 3

Except for using, instead of 100 parts of the nitrile group-containing copolymer rubber (A1), 100 parts of the nitrile group-containing copolymer rubber (B3) obtained in Synthesis Example 6, the same procedure was followed as in Example 2 to obtain a cross-linkable rubber composition and the same procedure was followed to evaluate it. The results are shown in Table 1.

Example 4

Using a Bambury mixer, to 100 parts of the nitrile-group containing copolymer rubber (A4) obtained in Synthesis Example 7, 40 parts of FEF carbon black (product name "Seast SO", made by Tokai Carbon), 5 parts of tri-2-ethylhexyl trimellitate (product name "ADK cizer C-8", made by Adeka, plasticizer), 1.5 parts of 4,4'-di-(α,α-dimethylbenzyl)diphenylamine (product name "Nocrac CD", made by Ouchi Shinko Chemical Industrial, antiaging agent), 1 part of stearic acid, 1 part of polyoxyethylenealkylether phosphoric acid ester (product name "Phosphanol RL210", made by Toho Chemical Industry, processing aid), 2.6 parts of hexamethylenediamine carbamate (product name "Diak#1", made by Dupont Dow Elastomer, polyamine cross-linking agent falling under aliphatic polyvalent amines), and 4 parts of 1,8-diazabicyclo[5,4,0]-undecene-7 (DBU) (product name "RHENOGRAN XLA-60 (GE2014)", made by RheinChemie, DBU 60% (including parts becoming zinc dialkyl diphosphate), basic cross-linking accelerator) were mixed and kneaded to obtain a cross-linkable rubber composition.

Further, the obtained cross-linkable rubber composition was measured and tested by the above-mentioned methods for 100% tensile stress, compression set resistance test (O-ring compression set), and heat buildup test. The results are shown in Table 2.

Example 5

Except for using, instead of 100 parts of the nitrile-group containing copolymer rubber (A4), 100 parts of the nitrile group-containing copolymer rubber (A5) obtained in the Synthesis Example 8, changing the amount of FEF carbon from 40 parts to 50 parts, changing the amount of tri-2-ethylhexyl trimellitate from 5 parts to 3 parts, using 2 parts of a polyether ester-based plasticizer (product name "ADK cizer RS-735", made by Adeka), and changing the amount of hexamethylenediamine carbamate from 2.6 parts to 1.9 parts, the same procedure was followed as in Example 4 to obtain a cross-linkable rubber composition and the same procedure was followed to evaluate it. The results are shown in Table 2.

Example 6

Except for using, instead of 100 parts of the nitrile-group containing copolymer rubber (A4), 100 parts of the nitrile group-containing copolymer rubber (A6) obtained in Synthesis Example 9, changing the amount of FEF carbon from 40 parts to 45 parts, changing the amount of hexamethylenediamine carbamate from 2.6 parts to 2.7 parts, changing the amount of tri-2-ethylhexyl trimellitate from 5 parts to 3 parts, and using 2 parts of an adipic acid ether ester-based plasticizer (product name "ADK cizer RS-107", made by Adeka), the same procedure was followed as in Example 4 to obtain a cross-linkable rubber composition and the same procedure was followed to evaluate it. The results are shown in Table 2.

Comparative Example 4

Except for using, instead of 100 parts of the nitrile-group containing copolymer rubber (A4), 100 parts of the nitrile group-containing copolymer rubber (B4) obtained in Synthesis Example 10, the same procedure was followed as in Example 4 to obtain a cross-linkable rubber composition and the same procedure was followed to evaluate it. The results are shown in Table 2.

Comparative Example 5

Except for using, instead of 100 parts of the nitrile-group containing copolymer rubber (A4), 100 parts of the nitrile group-containing copolymer rubber (B5) obtained in Synthesis Example 11, changing the amount of FEF carbon from 40 parts to 50 parts, changing the amount of tri-2-ethylhexyl trimellitate from 5 parts to 3 parts, using 2 parts of a polyether ester-based plasticizer (product name "ADK cizer RS-700", made by Adeka), and changing the amount of the hexamethylenediamine carbamate from 2.6 parts to 1.9 parts, the same procedure was followed as in Example 4 to obtain a cross-linkable rubber composition and the same procedure was followed to evaluate it. The results are shown in Table 2.

TABLE 1

|  |  | Examples | | | Comparative Examples | | |
|---|---|---|---|---|---|---|---|
|  |  | 1 | 2 | 3 | 1 | 2 | 3 |
| Type of nitrile group-containing copolymer rubber |  | A1 | A2 | A3 | B1 | B2 | B3 |
| Molecular weight adjuster used at start of polymerization (amount with respect to 100 parts of monomer) | | | | | | | |
| 2,2,4,6,6-pentamethyl-4-heptanethiol | (parts) | 0.03 | 0.04 | 0.027 | — | — | — |
| t-dodecylmercaptan | (parts) | 0.45 | 0.5 | 0.3 | 0.35 | 0.45 | 0.55 |
| Final polymerization conversion rate at end of polymerization | (%) | 85 | 80 | 90 | 80 | 80 | 80 |
| Composition Acrylonitrile units | (wt %) | 25.6 | 17.9 | 37.1 | 36.8 | 29.9 | 18.9 |
| 1,3-butadiene units*[1] | (wt %) | 45 | 46.6 | 62.9 | 63.2 | 70.1 | 45.6 |
| n-butyl acrylate units | (wt %) | 29.4 | 35.5 | — | — | — | 35.5 |
| 2-methoxyethyl acrylate units | (wt %) | — | — | — | — | — | — |
| mono n-butyl maleate units | (wt %) | — | — | — | — | — | — |
| Iodine value |  | 15 | 18 | 11 | 14 | 14 | 13 |
| Z-average radius of gyration | (nm) | 154.9 | 918 | 103 | 65.0 | 30 | 93 |
| Plasticity number |  | 42 | 30 | 61 | 14 | 23 | 48 |
| Heat loss | (wt %) | 0.28 | 0.23 | 0.15 | 1.20 | 0.22 | 0.40 |

TABLE 1-continued

|  |  | Examples | | | Comparative Examples | | |
|---|---|---|---|---|---|---|---|
|  |  | 1 | 2 | 3 | 1 | 2 | 3 |
| Tensile stress | | | | | | | |
| 100% tensile stress | (MPa) | 6.3 | 7.7 | 7.2 | 4.56 | 3.6 | 5.1 |
| Compression set test (disk compression set) | | | | | | | |
| Compression set | (%) | 23.4 | 24.8 | 22.5 | 29.8 | 38.7 | 31.9 |
| Heat buildup test | | | | | | | |
| Heat buildup temperature - surface | (° C.) | 122.8 | 125.3 | 120.4 | 127.8 | 133.4 | 129.3 |
| HBU - surface | (° C.) | +22.8 | +25.3 | +20.4 | +27.8 | +33.4 | +29.3 |
| Heat buildup temperature - inside | (° C.) | 155.4 | 157.4 | 152.6 | 163.7 | 164.1 | 161.0 |
| HBU - inside | (° C.) | +55.4 | +57.4 | +52.6 | +63.7 | +64.1 | +61.0 |

*[1]Including saturated parts

TABLE 2

|  |  | Examples | | | Comparative Examples | |
|---|---|---|---|---|---|---|
|  |  | 4 | 5 | 6 | 4 | 5 |
| Type of nitrile group-containing copolymer rubber | | A4 | A5 | A6 | B4 | B5 |
| Molecular weight adjuster used at start of polymerization (amount with respect to 100 parts of monomer) | | | | | | |
| 2,2,4,6,6-pentamethyl-4-heptanethiol | (parts) | 0.01 | 0.03 | 0.01 | — | — |
| t-dodecylmercaptan | (parts) | 0.4 | 0.35 | 0.6 | 0.45 | 0.4 |
| Final polymerization conversion rate at end of polymerization | (%) | 85 | 90 | 90 | 80 | 80 |
| Composition Acrylonitrile units | (wt %) | 35.1 | 20.8 | 24 | 36.2 | 19.7 |
| 1,3-butadiene units*[1] | (wt %) | 59 | 44.2 | 47.8 | 58.8 | 44.3 |
| n-butyl acrylate units | (wt %) | — | 30.5 | — | — | 31.2 |
| 2-methoxyethyl acrylate units | (wt %) | — | — | 23 | — | — |
| mono n-butyl maleate units | (wt %) | 5.9 | 4.5 | 5.2 | 5 | 4.8 |
| Iodine value | | 10 | 10 | 9 | 8 | 9 |
| Z-average radius of gyration | (nm) | 107.9 | 203 | 105 | 88 | 45 |
| Plasticity number | | 16 | 18 | 20 | 13 | 12 |
| Heat loss | (wt %) | 0.72 | 0.47 | 0.66 | 10.1 | 5.1 |
| Tensile stress | | | | | | |
| 100% tensile stress | (MPa) | 6.6 | 8.5 | 9.5 | 5.3 | 5.4 |
| Compression set test (Oring compression set) | | | | | | |
| Compression set | (%) | 34.4 | 39.6 | 35.6 | 41.5 | 42.9 |
| Heat buildup test | | | | | | |
| Heat buildup temperature - surface | (° C.) | 113 | 112.4 | 111.7 | 119.9 | 122.4 |
| HBU - surface | (° C.) | +13 | +12.4 | +11.7 | +19.9 | +22.4 |
| Heat buildup temperature - inside | (° C.) | 132.1 | 133.1 | 124.4 | 135.2 | 138.2 |
| HBU - inside | (° C.) | +32.1 | +33.1 | +24.4 | +35.2 | +38.2 |

*[1]Including saturated parts

As shown in Tables 1 and 2, the cross-linked rubber obtained by using the nitrile group-containing copolymer rubber of the present invention containing α,β-ethylenically unsaturated nitrile monomer units in a ratio of 10 to 60 wt % and having a Z-average radius of gyration of 100 nm or more was excellent in tensile stress and compression set resistance and had a low heat buildup property (Examples 1 to 6).

On the other hand, the cross-linked rubber obtained using a nitrile group-containing copolymer rubber having a Z-average radius of gyration of 100 nm or less was inferior in each of the tensile stress, compression set resistance, and low heat buildup property (Comparative Examples 1 to 5).

The invention claimed is:

1. A nitrile group-containing copolymer rubber containing α,β-ethylenically unsaturated nitrile monomer units in a ratio of 10 to 60 wt % and having a Z-average radius of gyration of 100 nm or more.

2. The nitrile group-containing copolymer rubber according to claim 1, wherein an iodine value of the nitrile group-containing copolymer rubber is 120 or less.

3. The nitrile group-containing copolymer rubber according to claim 1, wherein a plasticity number of the nitrile group-containing copolymer rubber is 14 to 90.

4. The nitrile group-containing copolymer rubber according to claim 1, wherein a heat loss of the nitrile group-containing copolymer rubber, measured by the oven method prescribed in JIS K6238-1, is 20 wt % or less.

5. The nitrile group-containing copolymer rubber according to claim 1, containing diene monomer units and/or α-olefin monomer units in a ratio of 40 to 90 wt %.

6. The nitrile group-containing copolymer rubber according to claim 5, containing α,β-ethylenically unsaturated monocarboxylic acid ester monomer units in a ratio of 5 to 50 wt %.

7. The nitrile group-containing copolymer rubber according to claim 5, containing carboxyl group-containing monomer units in a ratio of 1 to 30 wt %.

8. A cross-linkable rubber composition comprising the nitrile group-containing copolymer rubber according to claim 1 and a cross-linking agent.

9. A cross-linked rubber obtained by cross-linking the cross-linkable rubber composition according to claim 8.

* * * * *